United States Patent Office 2,775,605
Patented Dec. 25, 1956

2,775,605

ORGANO-SILICON COMPOUNDS AND METHODS FOR MAKING THEM

Peter L. De Benneville, Philadelphia, and Marvin J. Hurwitz, Elkins Park, Pa., assignors to Rohm & Haas Company, Philadelphia, Pa., a corporation of Delaware No Drawing. Application June 1, 1955,
Serial No. 512,571

15 Claims. (Cl. 260—448.2)

This invention concerns the production of organic silicon-containing compounds, novel methods of producing them, and it includes various new classes of such compounds.

The new compounds of the present invention have the structure of one of Formulas I and II:

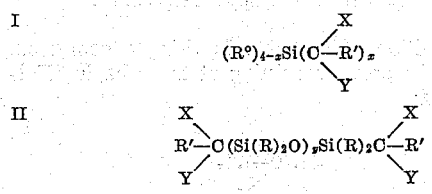

where $x$ is an integer having a value of 1 to 2, $y$ is an integral or mixed number having a value or an average value of about 1 to 9, R° is an alkenyl group, especially vinyl or allyl, or an alkyl group having 1 to 18 carbon atoms, and especially an alkyl of 1 to 4 carbon atoms (groups R° may be the same or different when the compound of Formula I contains a plurality thereof), R is a lower alkyl group having 1 to 3 carbon atoms, methyl being preferred (the R groups attached to a given silicon atom may be the same or different), R' is hydrogen, phenyl, benzyl, cyclohexyl, or an alkyl group having 1 to 18 carbon atoms, X and Y are electron-withdrawing groups, such as —COOR², —CHO, —COR², —CN, NO₂, R² being an alkyl or alkenyl group of 1 to 18 carbon atoms derivable from a monohydric alcohol, such as methyl, ethyl, propyl, isopropyl, butyl, amyl, hexyl, cyclohexyl, octyl, t-octyl, dodecyl, dodecenyl, hexadecyl, or octadecyl alcohol, with the proviso that X and Y cannot both be —COOR² in the same compound.

Specific groups of compounds are those of Formulas Ia, Ib, IIa, and IIb following:

Ia         (R°)₃SiCH(CN)(COOR²)
Ib         (R°)₃SiCH(COCH₃)(COOR²)
IIa  (R²OOC)(CN)CH(Si(R)₂O)y
                      Si(R)₂CH(CN)(COOR²)
IIb  (R²OOC(CH₃CO)CH(Si(R)₂O)y
                      Si(R)₂CH(COCH₃)(COOR²)

where the symbols are as defined hereinbefore. The preferred compounds are those of Formulas Ia and IIa derived from cyanoacetates. Of these, those in which R² is an alkyl group of 1 to 4 carbon atoms are the most valuable for the treatment of textiles (1) to modify the surface, and especially the feel, as described more particularly hereinafter, (2) to modify their dyeability, especially with acetate dyes, and (3) in conjunction with amines such as hexylamine, to improve the resistance to gas-fading of dyed cellulose acetate fabrics.

The new compounds are obtained by reacting a reactive methylene compound of the Formula III:

where the symbols are as previously defined, with a compound of one of the Formulas IV and V respectively, or with a compound of Formulas VI and VII respectively:

IV                 (R°)₄₋ₓSiClₓ
V                  Cl(Si(R)₂O)ySi(R)₂Cl
VI               (R°)₄₋ₓSi(NR³R⁴)ₓ
VII           R³R⁴N(Si(R)₂O)ySi(R)₂NR³R⁴ where R°, $x$, $y$, and R are as previously defined, and R³ and R⁴ together may be the morpholino residue =(CH₂CH₂)₂O, the piperidino residue —(CH₂)₅—, or the pyrrolidino residue —(CH₂)₄—, or separately; R³ may be cyclohexyl, phenyl, aralkyl, especially benzyl or an alkyl group having 1 to 18 carbon atoms, R⁴ may be hydrogen, cyclohexyl, aralkyl, especially benzyl, or an alkyl group having 1 to 18 carbon atoms, the total of carbon atoms in R³ and R⁴ together being no greater than 18, with the proviso that when R³ is an alkyl group containing a tertiary carbon atom attached to the nitrogen atom, then R⁴ must be H. Our copending application Serial No. 512,573, filed June 1, 1955, discloses and claims compounds of Formula VII and their preparation.

The chlorosilanes of Formula IV are known. In accordance with the present invention, they are reacted with a reactive methylene compound of Formula III, one to four moles of the latter compound being used per mole of the chlorosilane depending on the value of $x$ and the extent of replacement of the chlorine that is desired. A mixture of reactive methylene compounds may be used, if desired.

The chloropolysiloxanes of Formula V and their method of production are generally disclosed in U. S. Patent 2,381,366. These chloropolysiloxanes are preferably reacted with two molar equivalents of the reactive methylene compound of Formula III. If desired, a mixture of two different reactive methylene compounds within the scope of Formula III may be used to provide bis-substituted polysiloxanes which may include different terminal substituent groups.

In the reaction vessel there is present, besides the compound of one of Formulas IV and V and the reactive methylene compound of Formula III, a tertiary amine such as trimethylamine, triethylamine, pyridine or quinoline, to serve as an acceptor for the hydrogen chloride liberated. The reaction may be effected at a temperature of about —20° C. to room temperature, preferably between —5° C. and +10° C. The reaction is preferably carried out in an anhydrous solvent, such as benzene, toluene, or xylenes, or simply in one of the tertiary amines above. The reaction is rapid and exothermic and, therefore, it is preferred to add one of the reactants or a solution of one of the reactants to the other reactant or to a solution thereof in one of the anhydrous solvents mentioned above at a rate that is sufficiently slow to enable proper control of the temperature by cooling means. Generally, the reaction is complete at the end of the addition of one reactant to the other. Sufficient tertiary amine should be added to take up all of the hydrogen chloride liberated and preferably an excess over this amount is used.

When an amine of Formula VI or VII is reacted with the reactive methylene compound of Formula III, it is merely necessary to mix the compounds and heat the mixture to distill the amine NHR³R⁴ that is developed in the reaction. While this procedure has the advantage that hydrogen chloride is not developed and no acceptor therefore is needed, the reaction is much slower than that using the chlorosilyl compounds of Formulas IV and V, which latter is accordingly generally preferred.

Examples of the reactive methylene compounds that may be reacted with compounds IV and V (or with compounds VI and VII) include ethyl nitroacetate, malononitrile, methylmalononitrile, acetoacetic acid esters, e. g. the methyl, ethyl, isopropyl and higher esters thereof, cyanoacetic acid esters, e. g. the methyl, ethyl, isopropyl and higher esters thereof, acetylacetone, dimedone, and dihydroresorcinol.

The products of the invention (cf the Formulas I and II) have a wide variety of uses. The compounds of both Formulas I and II are of oily to viscous liquid character and are useful as synthetic lubricants and as hydraulic transmission media for hydraulically operated power systems. They are also useful as oil additives. The addition of 1% to 10% by weight, on the weight of a hydrocarbon lubricating oil of an ester of the present invention having $R^2$ in the groups —$COOR^2$ replaced by an alkyl group of 4 to 18 carbon atoms serves to depress the pour point and to improve the viscosity index. When proper care is taken to remove chlorine and hydrogen chloride from the reaction products, they are quite stable under normal temperature and humidity conditions encountered during storage. Those compounds of Formulas I and II in which R' is hydrogen are particularly adapted to be further reacted with other materials containing reactive groups to provide new useful compounds. Thus, the new compounds of this type may be applied to leather, rayon, cotton, or wool and heated to a temperature of 90° C. to 220° C. for a few minutes to an hour or more to modify the surface of the treated material in respect to feel and/or hydrophobicity.

In the examples which are illustrative of the invention, the parts given are by weight unless otherwise indicated:

Example 1

(a) To a stirred solution of 49.5 parts of methyl cyanoacetate, 202 parts of triethylamine and 264 parts of dry benzene, maintained at —5° C., there is added a mixture of 54.5 parts of trimethylchlorosilane and 264 parts of benzene. During the addition the temperature rises to +5° C. The reaction mixture is then filtered and the filtrate distilled to yield 85 parts (50% yield) of product, methyl trimethylsilylcyanoacetate, distilling in the range 75–6° C./0.65 mm. Hg, $n_D^{29.5}$ 1.445. Analysis.— Found: C, 49.1%; H, 7.6%; N, 8.2%. Theory: C, 49.1; H, 7.6%; N, 8.2%. Application of the product to leather, by rubbing, serves to render the leather supple and somewhat water-resistant.

(b) Similarly, the ethyl, n-butyl, hexyl, t-octyl, and octadecyl trimethylsilylcyanoacetates are prepared from the corresponding cyanoacetic acid ester. Application of these esters to leather by rubbing imparts good flexibility and increasing water-repellency in the order named.

(c) The methyl, n-butyl and dodecyl triethylsilylcyanoacetates are made in the same way but from triethylchlorosilane and they impart analogous properties to leather and other substrates to which they are applied.

Example 2

(a) To a stirred solution of 42 parts of ethyl acetoacetate, 70 parts of triethylamine, and 196 parts of dry benzene, there is added at 0–5° C. a solution of 35 parts of trimethylchlorosilane and 79 parts of dry benzene. The reaction mixture is then filtered and stripped of benzene. The residue is distilled to yield 55 parts (85% yield) of product, ethyl trimethylsilylacetoacetate, B. P. 87–8° C./12 mm. Hg, $n_D^{25}$ 1.442. Analysis.—Found: C, 53.0%; H, 8.8%. Theory: C, 53.5%; H, 8.9%.

Application of the product to a cellophane sheet by dipping the sheet in it, wiping off excess and heating to 85° C. imparts a slippery non-blocking character to the surface of the sheet. Application of the product to automobile windshields prevents formation of ice thereon.

(b) In similar fashion, the t-butyl, cyclohexyl, and hexadecyl trimethylsilylacetoacetates are made from the corresponding acetoacetic acid esters. These products impart water-repellency to leather treated therewith.

Example 3

(a) To a stirred solution of 75 parts of dichloropolydimethylsiloxane (having y in Formula II equal to an average of 3.2) and 450 parts of triethylamine in 300 parts of dry benzene, there is added gradually a solution of 90 parts of n-octyl acetoacetate in 200 parts of benzene. The reaction mixture is filtered and the benzene and excess amine is distilled off. The di-n-octyl ester of polydimethylsiloxane-bis-acetoacetic acid thereby obtained is an oily liquid useful as a synthetic lubricant for machinery. When this product is added to an essentially aliphatic hydrocarbon lubricating oil in an amount of 7% on the weight of the oil, the oil has improved characteristics in respect to lowered pour point and viscosity index. It is also useful to impregnate leather.

(b) In subsequent runs, the n-octyl acetoacetate is replaced with (1) methyl acetoacetate, (2) amyl acetoacetate, and (3) decyl acetoacetate. The products are similar to that of part (a) and improve the viscosity characteristics of lubricating oils to which they are added.

It is to be understood that changes and variations may be added without departing from the spirit and scope of the invention as defined in the appended claims.

We claim:

1. A composition of matter comprising a compound selected from the group consisting of those having Formulas I and II:

I 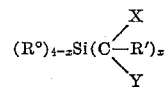

II 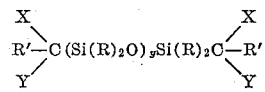

where x is an integer having a value of 1 to 2, y is an integral or mixed number having a value or an average value of about 1 to 9, $R°$ is selected from the group consisting of vinyl, allyl, and alkyl groups having 1 to 18 carbon atoms, R is an alkyl group having 1 to 3 carbon atoms, R' is selected from the group consisting of hydrogen, phenyl, benzyl, cyclohexyl and alkyl groups of 1 to 18 carbon atoms, and X and Y are electron-withdrawing groups selected individually from the group consisting of —$COOR^2$, —CHO, $COR^2$, —CN, and —$NO_2$, wherein $R^2$ is selected from the group consisting of alkyl and alkenyl groups having 1 to 18 carbon atoms with the proviso that X and Y cannot both be —$COOR^2$.

2. A composition of matter comprising a compound having the structure of Formula I as defined in claim 1.

3. A composition of matter comprising a compound having the structure of Formula II as defined in claim 1.

4. A composition comprising a compound of the formula

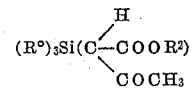

in which $R°$ is selected from the group consisting of vinyl, allyl, and alkyl groups having 1 to 18 carbon atoms, and $R^2$ is selected from the group consisting of alkyl and alkenyl groups having 1 to 18 carbon atoms.

5. A composition comprising a compound of the formula

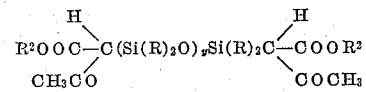

in which R is an alkyl group having 1 to 3 carbon atoms, $R^2$ is selected from alkyl and alkenyl groups having from 1 to 18 carbon atoms, and y is an integral or mixed number having a value or an average value of about 1 to 9.

6. A composition comprising a compound of the formula $$(R°)_3SiCH(CN)(COOR^2)$$

wherein R° is selected from the group consisting of vinyl, allyl, and alkyl groups having 1 to 18 carbon atoms, and $R^2$ is selected from the group consisting of alkyl and alkenyl groups having 1 to 18 carbon atoms.

7. A composition comprising a compound of the formula $$(R^2OOC)(CN)CH(Si(R)_2O)_ySi(R)_2CH(CN)(COOR^2)$$

wherein R is an alkyl group having 1 to 3 carbon atoms, $R^2$ is selected from the alkyl and alkenyl groups having from 1 to 18 carbon atoms, and $y$ is an integral or mixed number having a value or an average value of about 1 to 9.

8. A composition comprising methyl trimethylsilylcyanoacetate.

9. A composition comprising ethyl trimethylsilylacetoacetate.

10. A composition comprising di-n-octyl ester of a polydimethylsiloxane-bis-acetoacetic acid.

11. The method which comprises reacting a compound having the formula

with a compound selected from the group consisting of $$(R°)_{4-x}SiCl_x$$
$$Cl(Si(R)_2O)_ySi(R)_2Cl$$
$$(R°)_{4-x}Si(NR^3R^4)_x$$
$$R^3R^4N(Si(R)_2O)_ySi(R)_2NR^3R^4$$

where $x$, $y$, R°, R, R', X, and Y are defined in claim 1, and $R^3$ and $R^4$ together may be the morpholino residue $=(CH_2CH_2)_2O$, the piperidino residue $—(CH_2)_5—$, or the pyrrolidino residue $—(CH_2)_4—$, or separately; $R^3$ may be cyclohexyl, phenyl, aralkyl, especially benzyl, or an alkyl group having 1 to 18 carbon atoms, $R^4$ may be hydrogen, cyclohexyl, aralkyl, especially benzyl, or an alkyl group having 1 to 18 carbon atoms, the total of carbon atoms in $R^3$ and $R^4$ together being no greater than 18, with the proviso that when $R^3$ is an alkyl group containing a tertiary carbon atom attached to the nitrogen atom, then $R^4$ must be H.

12. The method which comprises reacting a compound having the formula

with a compound having the structure of the formula $$(R°)_{4-x}SiCl_x$$

in the presence of a tertiary amine, $x$, R', R°, X and Y being defined as in claim 1, and recovering a compound of Formula I as defined in claim 1.

13. The method which comprises reacting a compound having the formula

with a compound having the structure of the formula $$Cl(Si(R)_2O)_ySi(R)_2Cl$$

in the presence of a tertiary amine, $y$, R, R', X and Y being defined in claim 1, and recovering a compound of Formula II as defined in claim 1.

14. The method which comprises reacting a compound having the formula

with a compound having the structure of the formula $$(R°)_{4-x}Si(NR^3R^4)_x$$

the symbols $x$, R', R°, X, and Y being defined in claim 1, and $R^3$ and $R^4$ together may be the morpholino residue $=(CH_2CH_2)_2O$, the piperidino residue $—(CH_2)_5—$, or the pyrrolidino residue $—(CH_2)_4—$, or separately; $R^3$ may be cyclohexyl, phenyl, aralkyl, especially benzyl, or an alkyl group having 1 to 18 carbon atoms, $R^4$ may be hydrogen, cyclohexyl, aralkyl, especially benzyl, or an alkyl group having 1 to 18 carbon atoms, the total of carbon atoms in $R^3$ and $R^4$ together being no greater than 18, with the proviso that when $R^3$ is an alkyl group containing a tertiary carbon atom attached to the nitrogen atom, then $R^4$ must be H.

15. The method which comprises reacting a compound having the formula

with a compound having the structure of the formula $$R^3R^4N(Si(R)_2O)_ySi(R)_2NR^3R^4$$

where $y$, R, R', X and Y are as defined in claim 1, and $R^3$ and $R^4$ together may be the morpholino residue $=(CH_2CH_2)_2O$, the piperidino residue $—(CH_2)_5—$, or the pyrrolidino residue $—(CH_2)_4—$, or separately; $R^3$ may be cyclohexyl, phenyl, aralkyl, especially benzyl, or an alkyl group having 1 to 18 carbon atoms, $R^4$ may be hydrogen, cyclohexyl, aralkyl, especially benzyl, or an alkyl group having 1 to 18 carbon atoms, the total of carbon atoms in $R^3$ and $R^4$ together being no greater than 18, with the proviso that when $R^3$ is an alkyl group containing a tertiary carbon atom attached to the nitrogen atom, then $R^4$ must be H, distilling off an amine of the formula $NHR^3R^4$ formed by the reaction, and thereby obtaining in the residue a product of Formula II as defined in claim 1.

No references cited.